United States Patent
Fu et al.

(10) Patent No.: US 12,388,279 B2
(45) Date of Patent: Aug. 12, 2025

(54) CIRCUIT FOR DISCHARGING AN ENERGY STORE OF A DRIVE SYSTEM

(71) Applicant: Schaeffler Technologies AG & Co. KG, Herzogenaurach (DE)

(72) Inventors: Huan Fu, Rastatt (DE); Jürgen Tipper, Gernsbach (DE); Vincent Leonhardt, Haguenau (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 818 days.

(21) Appl. No.: 17/639,349

(22) PCT Filed: Sep. 15, 2020

(86) PCT No.: PCT/DE2020/100802
§ 371 (c)(1),
(2) Date: Mar. 1, 2022

(87) PCT Pub. No.: WO2021/052534
PCT Pub. Date: Mar. 25, 2021

(65) Prior Publication Data
US 2022/0344956 A1    Oct. 27, 2022

(30) Foreign Application Priority Data
Sep. 18, 2019   (DE) .................... 10 2019 125 098.6

(51) Int. Cl.
*H02J 7/00*    (2006.01)
*B60L 58/10*   (2019.01)
(Continued)

(52) U.S. Cl.
CPC ............ *H02J 7/0063* (2013.01); *B60L 58/10* (2019.02); *H02M 1/322* (2021.05); *H02M 3/158* (2013.01);
(Continued)

(58) Field of Classification Search
CPC ........ H02J 7/0063; B60L 58/10; H02M 1/322
See application file for complete search history.

(56) References Cited

U.S. PATENT DOCUMENTS 10,059,215 B1    8/2018  Haberman et al.
2010/0045248 A1  2/2010  Hawley
(Continued)

FOREIGN PATENT DOCUMENTS

CN    107643490 A     1/2018
DE    102012203778 A1 10/2012
(Continued)

*Primary Examiner* — Robert Grant
(74) *Attorney, Agent, or Firm* — Volpe Koenig

(57) ABSTRACT

A circuit for discharging an energy store of a drive system includes a power electronics unit in an on-board electrical system and a single-phase DC/DC converter connected upstream of the drive system. The converter includes a first capacitor, a coil connected downstream of the first capacitor, a first switch, a second switch connected downstream of the coil, and a second capacitor connected downstream of the second switch. The first switch is for a first current circuit including the first capacitor and the coil, and the second switch is for a second current circuit including the first capacitor, the second capacitor, and the coil. During a discharge process, the first switch and the second switch are designed to be switched in an alternating manner and differently relative to each other such that either the first current circuit or the second current circuit is closed to actively discharge the energy store.

11 Claims, 3 Drawing Sheets

(51) Int. Cl.
*H02M 1/32* (2007.01)
*H02M 3/158* (2006.01)
(52) U.S. Cl.
CPC ....... *B60L 2210/10* (2013.01); *H02J 2207/20* (2020.01); *H02J 2310/48* (2020.01)

(56) References Cited

U.S. PATENT DOCUMENTS

2014/0361626 A1   12/2014   Despesse
2017/0077859 A1*  3/2017   Chretien ................ H02P 27/06

FOREIGN PATENT DOCUMENTS

| DE | 112012005937 T5 | 12/2014 |
| DE | 102015105391 A1 | 10/2015 |
| DE | 102020123983 A1 | 3/2021 |
| EP | 2852998 B1 | 3/2014 |
| JP | 2017070007 A | 4/2017 |
| WO | 2010131340 A1 | 11/2010 |
| WO | 2010131353 A1 | 11/2010 |

* cited by examiner

CIRCUIT FOR DISCHARGING AN ENERGY STORE OF A DRIVE SYSTEM

CROSS-REFERENCE TO RELATED APPLICATIONS

This application is the United States National Phase of PCT Appln. No. PCT/DE2020/100802 filed Sep. 15, 2020, which claims priority to German Application No. DE102019125098.6 filed Sep. 18, 2019, the entire disclosures of which are incorporated by reference herein.

TECHNICAL FIELD

The present disclosure relates to a circuit for discharging at least one energy store of a drive system of an electric vehicle drive, e.g., in a hybrid electric, plug-in hybrid or purely electric vehicle, with a power electronics unit in an on-board electrical system.

BACKGROUND

Generic circuits are already sufficiently known in the prior art. For example, DE 10 2012 203 778 A1 discloses a method for controlling a hybrid drive train in a motor vehicle with an internal combustion engine with a crankshaft and with an electric machine that can be operated as a motor and generator with a rotor that is operatively connected to the crankshaft, a rotor that is operatively connected to the crankshaft-associated torsional vibration damper, an accumulator device for exchanging electrical energy with the electric machine and a corresponding accumulator device.

Discharge circuits are thus already known in which discharge is provided via an active discharge circuit embedded in power electronics, which requires additional components and thus installation space and results in greater costs. This has the disadvantage that at least one additional power semiconductor switch and additional power resistors are required to convert the stored energy into heat. In addition, such a discharge circuit requires a logic control.

According to the relevant safety standards, the electrical energy in a DC voltage intermediate circuit in a high-voltage on-board electrical system must be discharged to a level/voltage level that is harmless to humans within a short time period of 2 seconds. Such a DC voltage intermediate circuit is operated with a voltage of more than 60V DC/direct voltage and, according to the safety standards, should be discharged to below 60V DC/direct voltage.

According to the current state, depending on the voltage range of the voltage or battery voltage, this includes discharge voltages from 500V to 800V DC/direct voltage. According to the prior art, such a discharge takes place via an active charging circuit embedded in power electronics, which requires additional components and thus installation space and results in greater costs. As stated above, at least one additional power semiconductor switch and additional power resistors are required to convert the stored energy into heat, as well as a logic controller for this circuit.

This safety requirement generally relates to all electric vehicle drive systems with capacitive energy stores that are always present, wherein the energy store is present functionally and/or parasitically. Furthermore, in battery-operated electric vehicle drive systems, DC/DC converters are connected upstream of the drive converter in order to increase efficiency. These transformers generally have the task of tracking the intermediate DC circuit voltage of the drive inverter depending on the operating point of the drive system.

SUMMARY

The present disclosure to realizes the discharge in a drive system with a single-phase DC/DC converter.

The first switch and the second switch are designed to be switched in such an alternating manner and differently relative to each other such that either the first current circuit or the second current circuit is closed in order to actively discharge the at least one energy store of the on-board electrical system during a discharge process.

In other words, an active discharging of the entire energy store in the on-board electrical system is achieved by skillfully recharging the existing energy stores. This charge reversal of the energy store is realized by the alternating closing and opening of the first switch and the second switch. In other words, the DC voltage intermediate circuit of power electronics or the capacitances in an on-board electrical system is actively discharged in drive systems with an upstream single-phase DC/DC converter in buck-boost or boost topology. It should be noted that the first capacitor and the second capacitor each represent an energy store which is to be discharged.

The first switch and the second switch may be designed to force switching between the first current circuit and the second current circuit based on a predetermined time interval. The predetermined time interval in which the first current circuit is closed by closing the first switch may correspond at least approximately to the predetermined time interval in which the second current circuit is closed by closing the second switch. Thereby, the circuit switches between the first and the second current circuit periodically. In other words, this means that the first switch is switched periodically offset to the second switch.

The circuit may be designed in such a way that the switch is carried out independently/automatically continuously or until the desired voltage of less than 60V is reached or discharging is no longer desired.

The discharge process may be provided in such a way that either the first switch is closed and the second switch is open or the second switch is closed and the first switch is open. In other words, this means that as soon as the discharge process has started, one of the two switches is always in the open position and the other of the two switches is closed.

The first current circuit may define a first state of the discharge process in which the first capacitor is discharged via the coil when the first switch is closed and the second switch is open. The second current circuit may define a second state of the discharge process in which the second capacitor is discharged via the coil and the first capacitor is discharged when the second switch is closed and the first switch is open. This means that the two switch positions used only provide for switching between the first state and the second state. Thus, the first capacitor as a first energy store is always discharged alternately with the second capacitor as a second energy store.

In this context, the ohmic resistance of the first capacitor, the second capacitor, the coil, the first switch and the second switch, both in the first current circuit and in the second current circuit, may be specifically tailored to convert the energy stored in the respective current circuit into heat and emit it as heat. Here, no additional components are required/must be used for the discharge process or the discharging function. As a result, additional costs and installation space can be saved. This saving mainly relates to expensive power resistors and an additional semiconductor switch.

Furthermore, all power components of the DC/DC converter may be water-cooled. Thus, the thermal behavior is non-critical during the active discharge of the capacitors or energy stores. This is not the case when using power resistors. In other words, due to the existing water cooling, there is no risk that all power components of the DC/DC converter will overheat due to the energy converted into heat. Thus, the electrical energy is dissipated as heat by ohmic resistances of the first capacitor, the second capacitor, the coil and the first and the second switch.

A software routine may be integrated into the circuit. By means of this integrated software routine, it is possible to switch between the first current circuit and the second current circuit. Here, the predetermined time interval for switching between the two switch positions can be easily adjusted. In addition, the power components of the DC/DC converter and its control components such as gate drivers, microprocessors and current sensors can be used, so that no additional components are required. Furthermore, the software routine may be designed, for example, for automatically opening and closing the respective first switch or second switch.

The circuit may be designed and configured to discharge the at least one energy store to below 50V after, for example, 500 ms, but at least to below 60V in less than 2 seconds. Therefore, the safety standard of discharging the at least one energy store to below 60V in 2 seconds is easily met.

Furthermore, the present disclosure relates to an electric vehicle drive, e.g., for a hybrid electric, plug-in hybrid or purely electric vehicle, in which a circuit according to any of the preceding aspects is included.

Furthermore, the disclosure relates to a method for discharging at least one energy store of a drive system of an electric vehicle drive, e.g., in a hybrid electric, plug-in hybrid or purely electric vehicle, with a power electronics unit in an on-board electrical system. A single-phase DC/DC converter in the form of an actuator is connected upstream of the drive system, and the DC/DC converter provides a first capacitor, a coil connected downstream of the first capacitor, and a first switch for a first current circuit. The DC/DC converter also provides the first capacitor, the coil connected downstream of the first capacitor, a second switch connected downstream of the coil, and a second capacitor connected downstream of the second switch for a second current circuit. The first switch and the second switch are designed to be switched in such an alternating manner and differently relative to each other such that either the first current circuit or the second current circuit is closed in order to actively discharge the at least one energy store of the on-board electrical system during a discharge process.

BRIEF DESCRIPTION OF THE DRAWINGS

In the following, the disclosure is now explained in more detail with reference to figures.

In the figures.

The figures are only schematic in nature and serve only for understanding the disclosure. The same elements are provided with the same reference symbols.

DETAILED DESCRIPTION

Figure 1:
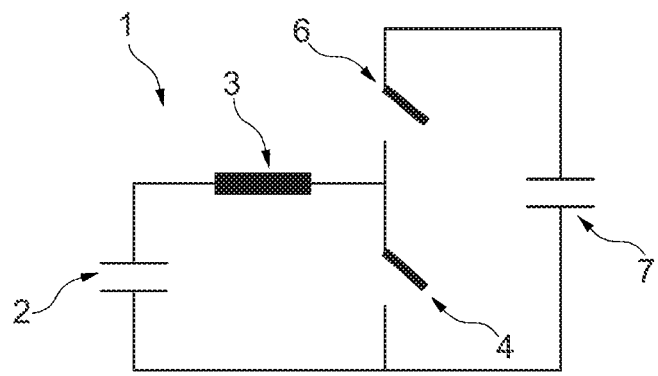
FIG. 1 shows a circuit diagram of a single-phase DC/DC converter.

FIG. 1 shows a circuit diagram of a single-phase DC/DC converter 1 for discharging at least one energy store of a drive system of an electric vehicle drive with power electronics in an on-board electrical system. The single-phase DC/DC converter 1 is connected upstream of the drive system as an actuator. FIG. 1 shows that the DC/DC converter 1 has a first capacitor 2, a coil 3 connected downstream of the first capacitor 2 and a first switch 4 for a first current circuit 5 (shown in FIG. 2). Furthermore, the DC/DC converter 1 has the first capacitor 2, the coil 3 downstream of the first capacitor 2, a second switch 6 downstream of the coil 3, and a second capacitor 7 downstream of the second switch 6 for a second current circuit 8 (shown in FIG. 3). In FIG. 1 the first switch 4 and the second switch 6 are shown in an open position.

Figure 2:
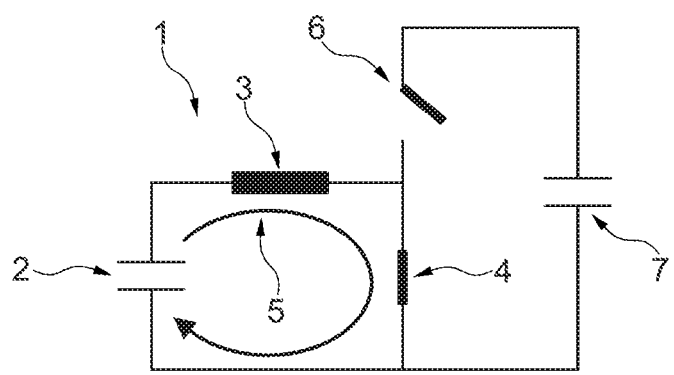
FIG. 2 shows a circuit diagram of a single-phase DC/DC converter according to a first state of the active discharge process.

FIG. 2 shows a circuit diagram of the single-phase DC/DC converter 1 from FIG. 1 according to a first state 10 (shown in FIG. 5) of the active discharge process. In the first state 10, the first switch 4 is closed and the second switch 6 is in an open position. The first current circuit 5 closed by the first switch 4 enables the first capacitor 2 to be discharged via the coil 3 connected downstream. The second capacitor 7 is thus ignored here.

Figure 3:
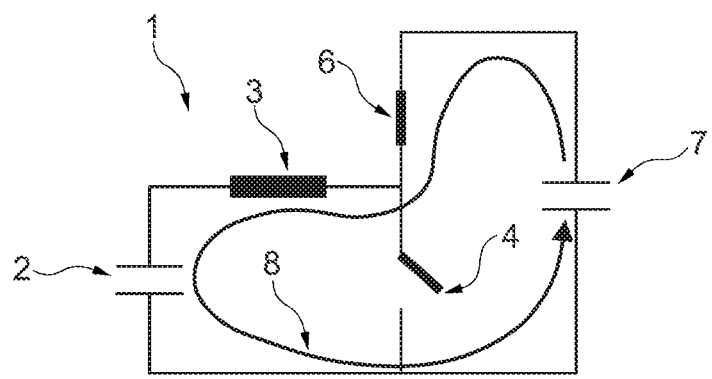
FIG. 3 shows a circuit diagram of a single-phase DC/DC converter according to a second state of the active discharge process.

FIG. 3 shows a circuit diagram of the single-phase DC/DC converter 1 from FIG. 1 according to a second state 11 (shown in FIG. 5) of the active discharge process. In the second state 11, the second switch 6 is closed and the first switch 4 is in an open position. The second current circuit 8 closed by the second switch 6 enables the second capacitor 7 to be discharged via the coil 3 and the first capacitor 2.

Figure 4:
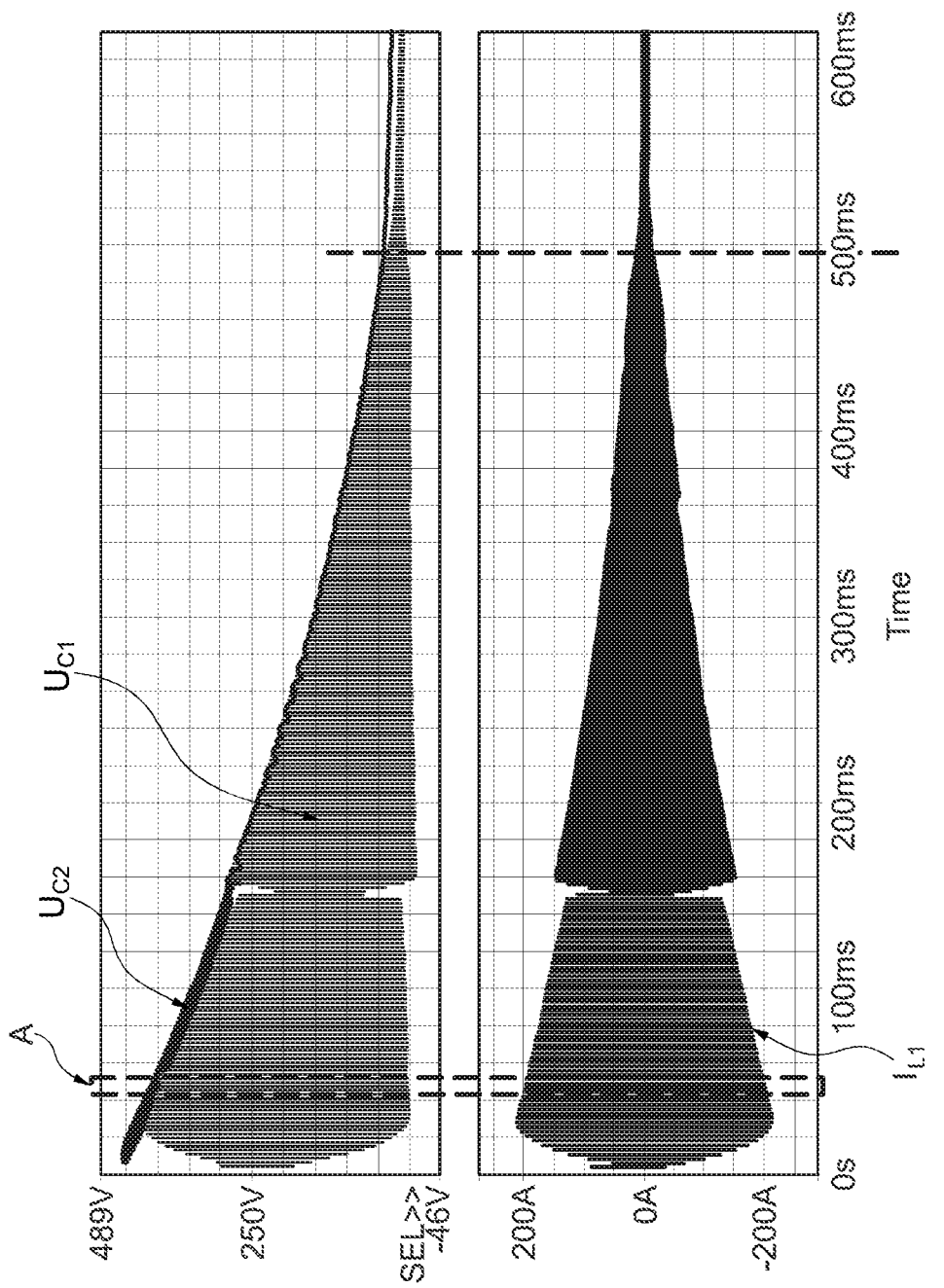
FIG. 4 shows a diagram to represent the voltage and current curve over time during an entire active discharge process.

FIG. 4 shows a diagram for representing the voltage and current curve over time during an entire active discharge process. FIG. 4 contains an upper voltage-related and a lower current-related diagram. The time in milliseconds is plotted on the x-axis in a range between 0 s and 600 ms. The voltage in volts in a range between −46V and +489V is plotted on the y-axis in the upper diagram and the current in amperes in a range between −200 A and +200 A is plotted on the y-axis in the lower diagram.

The upper diagram in FIG. 4 shows the voltage curve UC1 in the first capacitor 2 and the voltage curve UC2 in the second capacitor 7. It can be seen here that the voltages UC1 from the first capacitor 2 and the voltages UC2 from the second capacitor 7 are already below 50V after 500 ms. A more detailed description of this follows in relation to FIG. 5.

The lower diagram of FIG. 4 shows the current curve IL in the coil 3. The current IL describes the behavior of the current at the coil 3 during the discharge process according to the alternating switching between the first state 10 and the second state 11. In other words, IL describes the curve of the current based on switching between the first current circuit 5 and the second current circuit 8.

Figure 5:
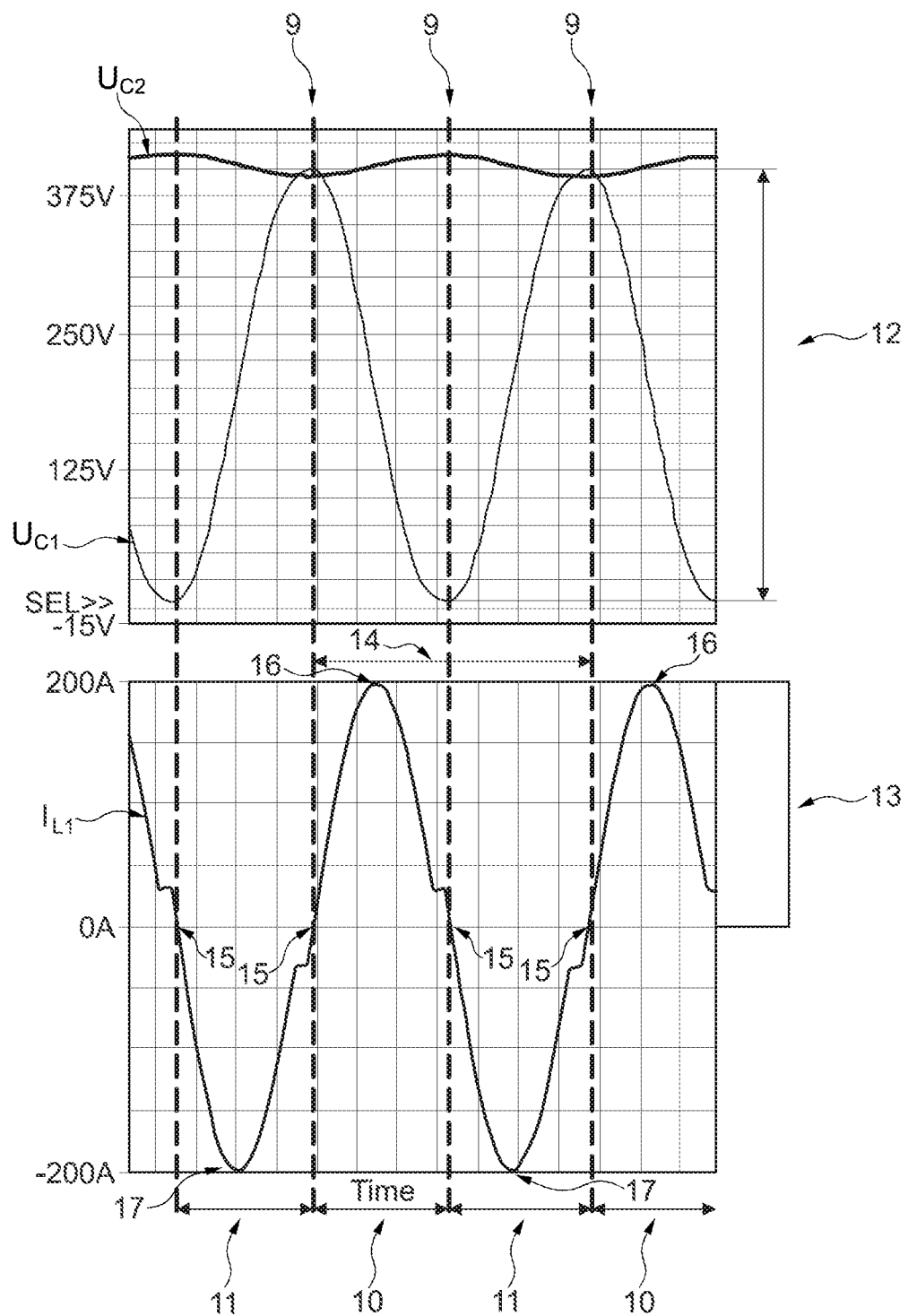
FIG. 5 shows a diagram for the enlarged representation of section A from FIG. 4.

FIG. 5 shows a diagram for the enlarged representation of section A from FIG. 4. According to FIG. 4, two diagrams are also shown in FIG. 5; an upper diagram relating to voltage and a lower diagram relating to current. Two characteristic curves can be seen in the upper diagram. A first characteristic curve describes the voltage curve UC1 and a second characteristic curve describes the voltage curve UC2.

The first characteristic curve according to UC1 in the upper diagram describes the curve of the voltage according to the first capacitor 2 in the single-phase DC/DC converter 1. The alternating closing and opening of the switches 4 and 6 can be seen. When the first switch 4 is closed and the first capacitor 2 is discharged according to the first state 10, the curve of the characteristic curve UC1 falls. As soon as the first switch 4 is open and the second switch 6 is closed, the second capacitor 7 is discharged according to the second state 11. In this second state 11, the characteristic curve UC1 rises.

A synopsis of the alternating switching between the two states 10 and 11 results in a wavy/sinusoidal curve. The peak-to-valley value 12 becomes smaller and smaller as time progresses, until the curve moves only in the voltage range from 0V to 50V according to FIG. 4 at about 500 ms seconds.

The second characteristic according to UC2 in the upper diagram describes the curve of the voltage according to the second capacitor 7 in the single-phase DC/DC converter 1. Here, again, the alternating closing and opening of the switches 4 and 6 can be seen. When the second switch 6 is closed and the second capacitor 7 is discharged according to the second state 11, the curve of the characteristic curve UC2 falls. As soon as the second switch 6 is open and the first switch 4 is closed, the first capacitor 2 is discharged according to the first state 10. In this first state 10, the characteristic curve UC2 rises.

A synopsis of the alternating switching of the two states 10 and 11 again results in a wave-shaped/sinusoidal curve. The peak-to-valley value 12 becomes smaller and smaller as time progresses and the entire voltage level falls so that the voltage range is between 0 and 50V at around 500 ins.

A comparison of the two characteristic curves UC1 and UC2 shows that the peak-to-valley value 12 of the characteristic curve UC1 is significantly greater than the peak-to-valley value 12 of the characteristic curve UC2. Furthermore, the upper diagram of FIG. 5 shows that the curve UC1 falls when the curve UC2 rises and vice versa. This reflects the switching between the two states 10 and 11, or the alternating discharge of the first capacitor 2 and the second capacitor 7. The peak-to-valley value 12 of UC1 is significantly greater than that of the characteristic curve UC2. The background to this is that the second capacitor 7 is discharged via the first capacitor 2 and the coil 3, and the first capacitor 2 is only discharged via the coil 3. Thus, the voltage level of the characteristic curve UC1 rises significantly higher. The characteristic curve UC2 shows a very flat curve, but at a consistently higher voltage level. The period duration 14 of both characteristic curves UC1 and UC2 is defined by the common duration of the first state 10 and the second state 11 together.

A characteristic curve IL1 is shown in the lower diagram. In the current curve IL1 it can be seen that when switching from the first state 10 to the second state 11 or when switching from the second state 11 to the first state 10, a zero point 15 is passed through in each case. Accordingly, a high point 16 of the current curve IL1 is in the center of the first state 10 in terms of time and a low point 17 of the current curve IL1 in the center of the second state 11 in terms of time. The amplitude 13 is defined from the zero line to the high point 16 or low point 17 of the current curve IL1 and also decreases as time progresses so that the current curve approaches the zero line as the discharge process progresses.

REFERENCE NUMERALS

1 DC/DC converter
2 First capacitor
3 Coil
4 First switch
5 First current circuit
6 Second switch
7 Second capacitor
8 Second current circuit
9 Time interval
10 First state
11 Second state
12 Peak-to-valley value
13 Amplitude
14 Period duration
15 Zero point
16 High point
17 Low point

The invention claimed is:

1. A circuit for discharging an energy store of a drive system of an electric vehicle drive, comprising:
a power electronics unit in an on-board electrical system;
a single-phase DC/DC converter connected upstream of the drive system, the single-phase DC/DC converter comprising:
a first capacitor;
a coil connected downstream of the first capacitor; a first switch;
a second switch connected downstream of the coil; and
a second capacitor connected downstream of the second switch;
wherein:
the first switch is for a first current circuit comprising the first capacitor and the coil;
the second switch is for a second current circuit comprising the first capacitor, the second capacitor, and the coil;
during a discharge process, the first switch and the second switch are designed to be switched in an alternating manner and differently relative to each other such that either the first current circuit or the second current circuit is closed to actively discharge the energy store; and
wherein the discharge process is provided such that either the first switch is closed and the second switch is open or the second switch is closed and the first switch is open.

2. The circuit of claim 1 wherein the electric vehicle drive is a hybrid electric, plug-in hybrid or purely electric vehicle.

3. A circuit for discharging an energy store of a drive system of an electric vehicle drive, comprising:
a power electronics unit in an on-board electrical system;
a single-phase DC/DC converter connected upstream of the drive system, the single-phase DC/DC converter comprising:
a first capacitor;
a coil connected downstream of the first capacitor; a first switch;
a second switch connected downstream of the coil; and
a second capacitor connected downstream of the second switch;
wherein:

the first switch is for a first current circuit comprising the first capacitor and the coil;

the second switch is for a second current circuit comprising the first capacitor, the second capacitor, and the coil;

during a discharge process, the first switch and the second switch are designed to be switched in an alternating manner and differently relative to each other such that either the first current circuit or the second current circuit is closed to actively discharge the energy store wherein the single-phase DC/DC converter is an actuator.

4. The circuit of claim 1, wherein the first switch and the second switch are designed to force switching between the first current circuit and the second current circuit based on a predetermined time interval.

5. The circuit of claim 1, wherein the first current circuit defines a first state of the discharge process in which the first capacitor is discharged via the coil when the first switch is closed and the second switch is open.

6. The circuit of claim 1, wherein the second current circuit defines a second state of the discharge process in which the second capacitor is discharged via the coil, and the first capacitor is discharged when the second switch is closed and the first switch is open.

7. The circuit of claim 1, wherein an ohmic resistance of the first capacitor, the second capacitor, the coil, the first switch and the second switch in the first current circuit and in the second current circuit is selected to convert energy stored in the respective current circuit into heat and to emit it as heat.

8. The circuit of claim 1, wherein the single-phase DC/DC converter comprises an integrated software routine.

9. The circuit of claim 1, wherein the single-phase DC/DC converter is designed to discharge the energy store to below 50 V.

10. An electric vehicle drive comprising the circuit of claim 1.

11. A method for discharging an energy store of a drive system of an electric vehicle comprising a power electronics unit in an on-board electrical system, comprising:

connecting a single-phase DC/DC converter upstream of the drive system, the single-phase DC/DC converter comprising:

a first capacitor;

a coil connected downstream of the first capacitor; and a first switch;

a second switch connected downstream of the coil; and a second capacitor connected downstream of the second switch; wherein:

the first switch is for a first current circuit comprising the first capacitor and the coil; and the second switch is for a second current circuit comprising the first capacitor, the coil, and the second capacitor; and switching the first switch and the second switch in an alternating manner and differently relative to each other such that either the first current circuit or the second current circuit is closed to actively discharge the energy store of the on-board electrical system during a discharge process;

wherein the single-phase DC/DC converter is an actuator.

* * * * *